April 4, 1933. M. W. PIERCEY 1,903,390
GEAR
Filed June 8, 1932 4 Sheets-Sheet 1

INVENTOR
Maurice Walter Piercey
BY
ATTORNEY

April 4, 1933. M. W. PIERCEY 1,903,390
GEAR
Filed June 8, 1932 4 Sheets-Sheet 2

INVENTOR
Maurice Walter Piercey
BY
ATTORNEY

April 4, 1933.  M. W. PIERCEY  1,903,390
GEAR
Filed June 8, 1932    4 Sheets-Sheet 4

INVENTOR
Maurice Walter Piercey
BY
B. Singer
ATTORNEY

Patented Apr. 4, 1933

1,903,390

UNITED STATES PATENT OFFICE

MAURICE WALTER PIERCEY, OF NORBURY, LONDON, ENGLAND, ASSIGNOR TO JOAN ORAM CHRYSTAL, OF SUMMIT, NEW JERSEY

GEAR

Application filed June 8, 1932, Serial No. 616,147, and in Great Britain September 29, 1931.

This invention relates to gears and especially to conical friction gears, and has for its object to provide a mechanism of this type giving infinitely variable ratios, neutral and reverse, of a particularly advantageous and efficient construction.

Infinitely variable friction gears in which the neutral position is obtained on the driven member and which gears are capable of rotation in either direction, hitherto have employed a differential gear-box between the driving and driven members, the third portion of the differential gearing being connected to a third member, the speed of which can be varied in relation to the driving member at will.

This type of conical friction gear has, however, the inherent fault that the final drive can only be the difference between the two other members connected to the differential, as one is a positive action whilst the other is a negative action. Thus, at low ratios, owing to the difference being a very small percentage, excessive loads are set up upon the frictional varying portion of the gear, making such gears impractical for any except very small powers.

In gears constructed according to the invention, no differential gearing is used to obtain the neutral and reverse and this ensures that the loading is never more than that required to transmit the final torque, at the varying speeds.

According to the present invention, satellite conical friction gears are carried by a cage and each comprises at least three conical portions having a common axis, the whole, however, rotating about the said common axes.

These conical portions each comprise what may be termed a driven cone, a rolling cone and a driving cone. The driven and rolling cones in practice are represented by truncated portions which may be at the bases of the composite cones or otherwise and these two cones have a common theoretical apex located in an extension of the axis of a driving shaft around which axis the cage carrying the satellites is adapted to rotate. Each compound satellite cone has its driving cone so arranged that the inner or outer, preferably the latter, generating line of the conical surface comes parallel to the same axis.

The cones are so arranged that the driving cone, which preferably is of the opposite conicity to the driven and rolling cones, is intersected by the theoretical extension towards its apex of the rolling cone in a circular section towards one end of the driving cone, and similarly the theoretical extension of the driven cone towards its apex also intersects the driving cone, towards the other end thereof.

The driving shaft drives the satellites either in the manner of a sun pinion or by a friction annulus, preferably the latter, and co-operating rolling surfaces are provided either on the exterior or interior, according to the precise arrangement adopted, and in this manner the driven cone of each satellite is rotated from the driving shaft, causing its rolling cone to roll on a fixed path which may be interior or exterior, preferably the latter, and there is provided a take-off means for engaging the surface of the driving cone in the position where it comes parallel to the axis of rotation of the driving shaft, which take-off means is connected to the driven shaft.

Thus, by varying the position of the take-off means on the driving cone of the satellites (that is by moving it to or from the theoretical apices of such driving cones), this take-off means may be driven at any speed from neutral to at least and even above the same speed as the driving shaft and in reverse, the latter also in an infinitely variable manner within its limitations.

The take-off means may act on the interior or exterior, but preferably the latter.

To balance the action, each compound conical satellite may be provided with a further rolling surface which forms a portion of the driven cone thereof, but in a position towards the other end of the satellite shaft concerned.

Any desired and usual means may be provided for causing the various frictionally engaging conical surfaces to maintain their frictional gripping contact, and in some cases this may be effected by known cam actions, which according to the drive increase the grip of the parts. Similarly, thrust bearings may be provided where required.

In order that the invention may be better understood, it will now be described with reference to the accompanying drawings in which:—

Fig. 5 shows a similar view to Fig. 1 but showing the invention applied to the gear box for a motor vehicle or the like.

Figure 1:
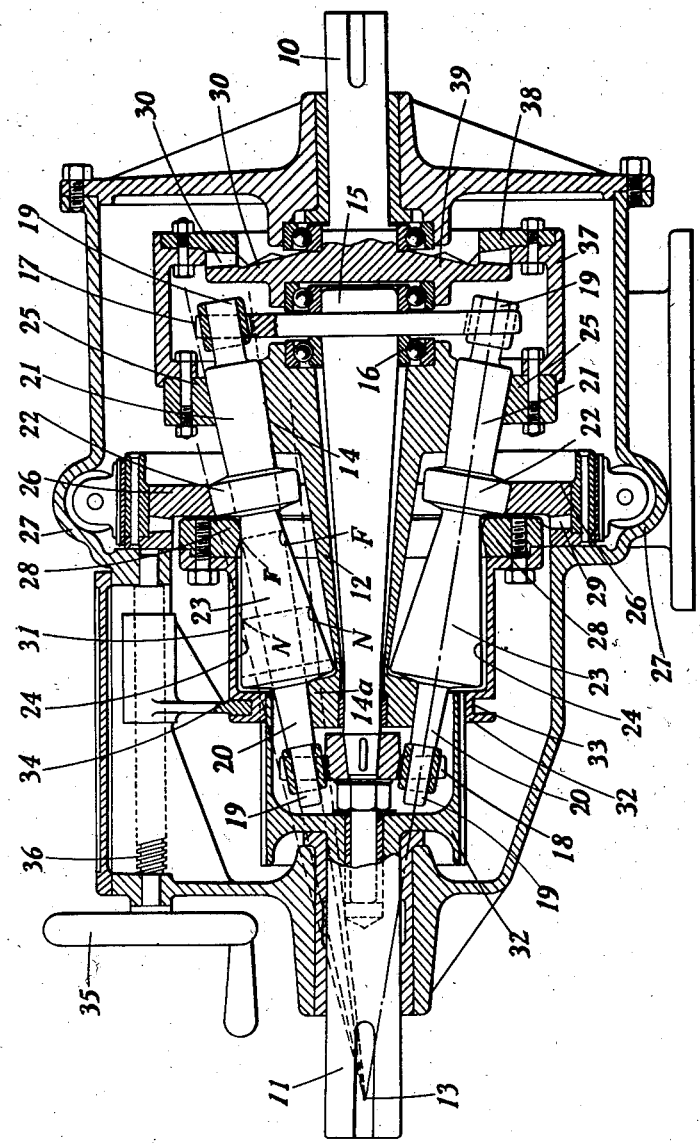
Fig. 1 shows a cross-sectional elevation of one form of variable gearing constructed according to the invention, adapted for the converting gear for ships' winches or otherwise.

In the particular constructional method of carrying the invention into effect shown in Fig. 1, which is particularly suitable for ships' winches or other like purposes, the driving shaft 10 is axially aligned with the driven shaft 11 and spigoted between the ends of these shafts is freely mounted a conical sun member 12, the apex 13 of which comes on the axis of the aligned shaft and the active portions of which are comprised by a disc section 14 towards the base and another 14ª towards the apex. The spigoted end 15 at the base which is mounted in the end of the driving shaft 10 or a part attached thereto, is fitted with a thrust bearing 16. A cage 17 and 18 of suitable form is provided carrying any desired number, for example four, equiangularly spaced inclined shafts or spindles 19, the axes of which meet at the apex 13 of the sun cone 12. These shafts 19 are formed with or carry the compound satellite gears and towards the end nearer the main axis have a conical portion 20 in frictional gear with the conical portion 14ª towards the apex 13 of the sun cone 12. Towards the other end, each satellite shaft 19 is formed or provided with another conical portion 21 in frictional contact with the other conical part 14 of the sun cone 12, the two said conical portions 20 and 21 on the satellite being on a common cone having its apex at the apex of the sun cone.

The conical satellite portion 21 in engagement with the larger coned portion 14 of the sun cone is the driven cone and displaced a desired axial distance therefrom, and towards the apex thereof, another conical member 22 is provided. This is represented by a disc forming the base of the cone, and is a desired amount larger in diameter than the driven cone 21. This larger cone 22 on the satellite axis is the rolling cone.

Between the rolling cone 22 and the conical portion 20 on the satellite axis in gear with the smaller disc 14ª of the sun cone 12, is provided the driving cone 23 of the satellite. This has its base remote from the rolling cone 22 and its smaller end adjacent the said rolling cone.

The conicities and dimensions are so chosen that the uppermost or outermost generating line 24 of the driving cone 23 comes parallel with the axis of the driving and driven shafts 10 and 11 and sun cone 12.

Three annular members are provided. One of these 25 frictionally meshes with and comes around all the driven cones 21 and is suitably connected (as hereafter explained) to the driving shaft 10 and is the means by which the driving shaft 10 imparts rotation to the satellite cones. Although the driven cones 21 of the satellites have conical surfaces, the engaging surface of this driving annulus 25 may be correspondingly coned, or may be curved, the curve giving desired driving contacts with the driven cones.

The second annulus 26 is fixed to the outer casing 27 or other suitable fixed part and comes into meshing contact with the rolling cones 22, either with a conical surface as shown or with a curved surface.

The third annulus 28 comes into frictional driving contact with the surfaces of the driving cones 23 of the satellites in positions 24 where these surfaces are parallel with the axis of rotation of the driving and driven shafts and this third annulus 28 is suitably connected (as hereafter described) to the driven shaft and in such a manner that it can be axially moved to a desired extent by any suitable lever or other gearing.

In the construction shown in Fig. 1, the driven annulus 28 is connected to a sleeve 31 having an inwardly turned flange at its free end splined on to a correspondingly formed sleeve 32 integral with the driven shaft 11. The arrangement is such that the sleeve 31 can readily be moved upon the sleeve 32 and impart its rotation thereto and consequently to the driven shaft 11.

For the purpose of moving the sleeve 31, it is formed with an annular groove 33 engaged by striking gear 34 operated from a hand-wheel 35 and including a screwed stem 36. In this manner, by suitably turning the hand-wheel 35, the driven annulus 28 can be set into any suitable position axially with respect to the surfaces 24 of the driving cones 23.

The connection between the driving annulus 25 and the driving shaft 10 comprises a sleeve 37 to a flange of which the annulus 25 is bolted and another flange of which is connected to a ring 38 formed on one of its surfaces with bevelled cam members which form a driving connection with similar members on a disc 39 connected to or formed in one with the driving shaft in a manner hereafter described.

The arrangement of the parts and the operation will readily be understood from Fig. 1 with the aid of the diagrammatic views 2, 3 and 4. These show one diagrammatically represented satellite roller with the three conical portions 21, 22 and 23 together with their engaging annuli 25, 26 and 28. In the respective Figures 2, 3 and 4, the striking gear operated from the hand-wheel 35 has been employed to bring and retain the annulus 28 into three desired positions.

Figure 2:
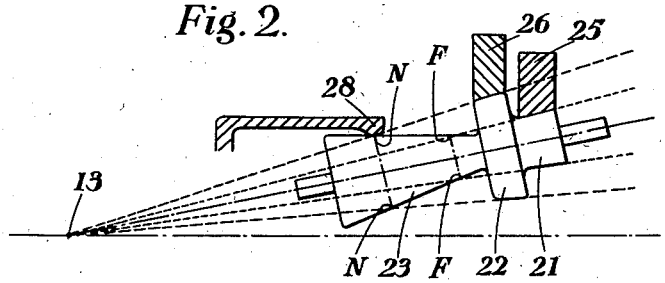
Figs. 2, 3 and 4 show diagrams illustrating the action of the gear according to the invention.
Figure 4:
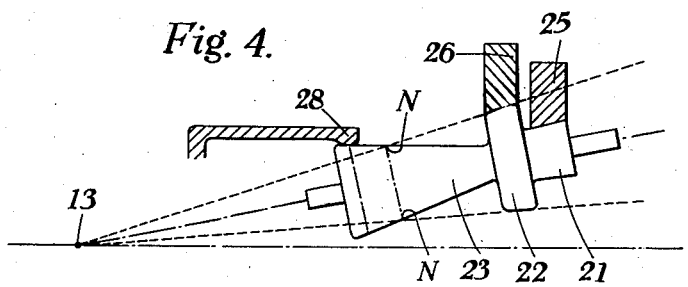

The rolling cone 22, if theoretically produced as shown in Figs. 2 and 4, towards its apex 13 will have a common circular section N—N (Figs. 2 and 4) with the driving cone 23 and it therefore follows that this common circular section N—N will represent the neutral position owing to the fact that when the rolling cone 22 rolls around its fixed annulus 26, in a similar manner this common section N—N will roll around the driven annulus 28 without imparting movement thereto.

Figure 3:
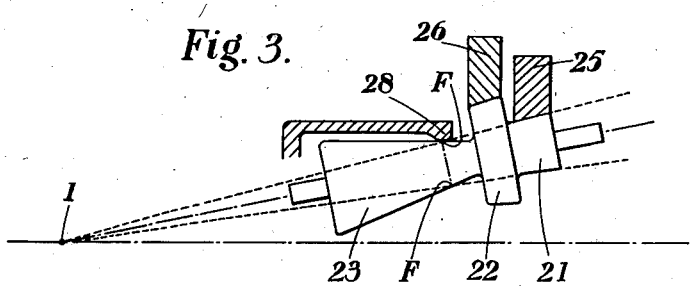

In a similar manner, the driven cone 21, if theoretically produced as shown in Figs. 2 and 3, has a common circular section F—F with the driving cone 23 and consequently if the driven annulus 28 is moved to this position as shown in Figs. 1 and 3, it has imparted thereto a speed similar to that of the driving annulus 25. In intermediate positions between the two particularly discussed, that is between the common circular sections N—N and F—F, it therefore follows that an infinite variation of speeds from neutral to that of the driving shaft 10 can be given to the driven shaft 11 owing to the fact that the driving shaft 10 drives the annulus 25 and the annulus 28 drives the driven shaft 11.

By moving the driven annulus 28 from the position shown in Fig. 2 towards the base of the driving cone 23, for example to the position shown in Fig. 4 it further follows that this driven annulus 28 is turned in a direction contrary to that of the driving shaft 10 and annulus 25 and at a speed according to its distance from the neutral position N—N.

The constructional form of device shown in Fig. 5, which is particularly suitable for the gear box of motor road vehicles and the like, is generally similar to that described with reference to Fig. 1, except that the striking gear for varying the position of the sleeve 31 differs to some extent and is not subject to the control of the hand-wheel.

This striking gear comprises a sleeve 40 adapted to be moved along a rod 41 by any suitable means, for example a gear change lever.

Figure 5:
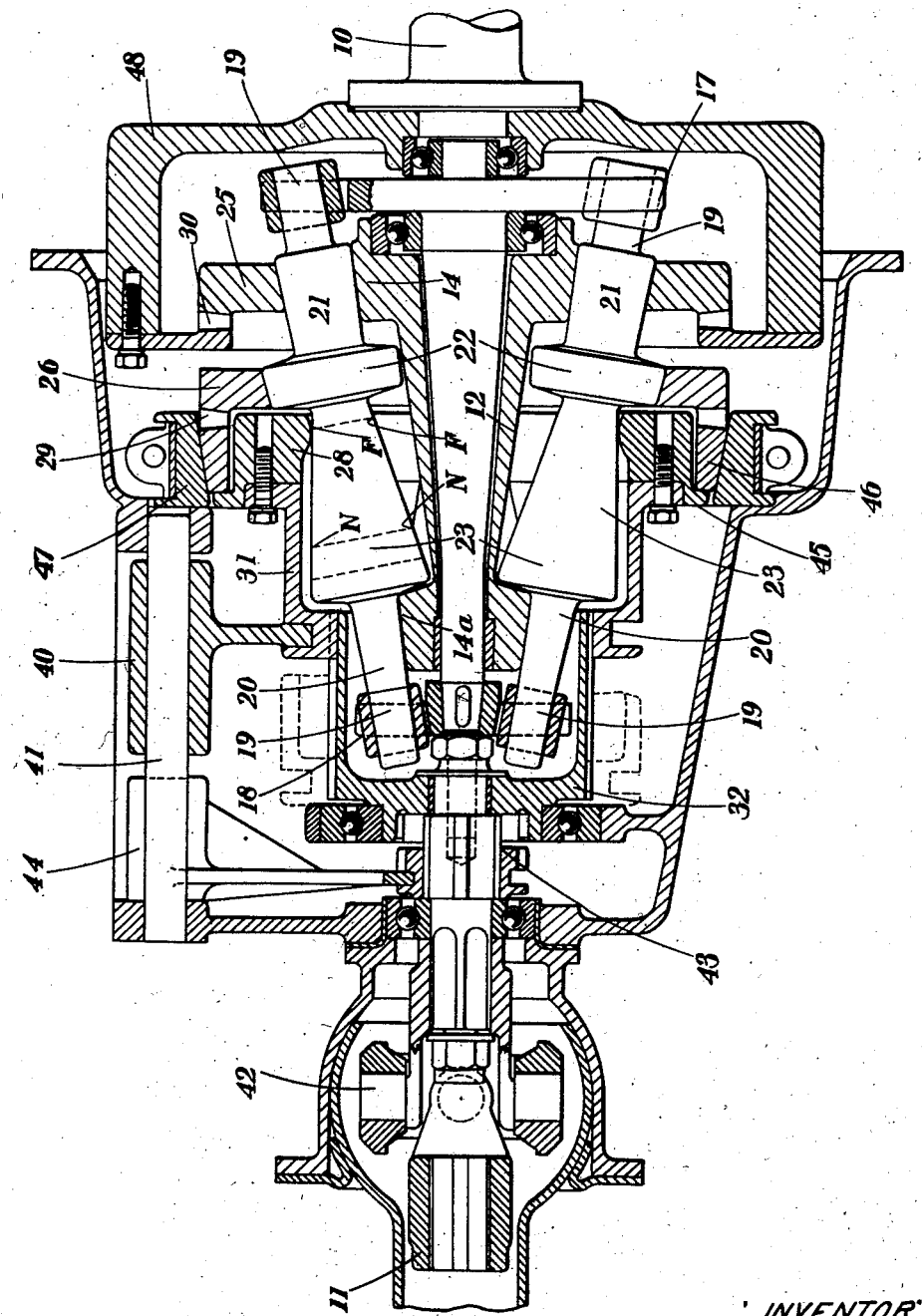

In addition, between the sleeve 32 and the driven shaft 11 is disposed in the ordinary way a cardan joint 42 and in addition a dog clutch 43, controlled by the movements of a gate sleeve 44 so that when desired and when the parts are in the position shown in Fig. 5, the driven shaft 11 is uncoupled from the rest of the mechanism.

In operation, the driven annulus 28 is brought into any suitable position on the driving cones 23 to give forward drive or reverse drive or to be set in the neutral position.

When, in the operation of the gear, it is desired to change gear, assuming the dog clutch 43 is in the disengaged position, then the driven annulus 28 is brought to the neutral position and the dog clutch brought to the right into the engaged position and then the driven annulus is moved by the sleeve 40 to any desired position, either for forward drive or reverse drive.

As shown in Fig. 5, the said annulus 28 is in the position where it is given the full forward drive and if desired a flange 45 (such as shown in the drawings) is incorporated with such annulus 28 and serves to come against and give a slight axial movement to the inner member 46 of a clutch and so that when set in this position this inner member is brought out of gripping contact with the outer fixed member 47 of the clutch so that the whole device rotates as one.

When, however, the driven annulus 28 is in any position between the full drive position and the neutral position, then the inner clutch member 46 engages the outer clutch member 47.

As will be seen, in the construction in Fig. 5 the driving annulus 25 is connected through the cam device 30 to the fly wheel 48 carried by the driving shaft 10.

Figure 6:
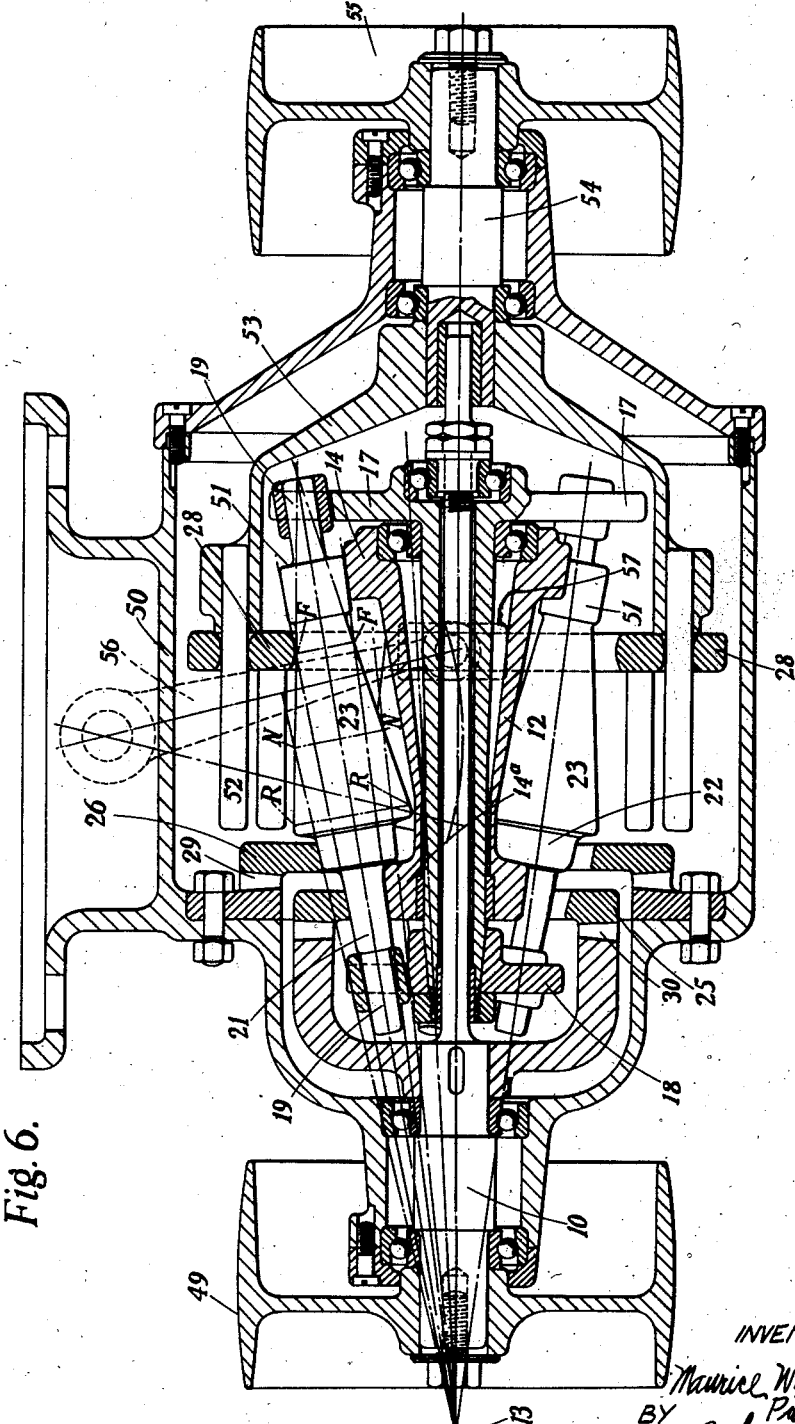
Fig. 6 shows a similar view to Fig. 1 but with the invention applied to a machine tool counter-shaft.

Referring to Fig. 6, this shows the converting gear arranged as a machine tool counter-shaft for giving a complete range of speeds in either direction by the operation of a simple lever or other handle which may be arranged in a manner similar to belt-shifting handles as at present used on counter-shafts. Further, owing to the final drive being by means of belting, the torque at low speed cannot increase beyond the capacity of the belt and should overloading take place, the belt will slip.

Referring to the drawings, in this case 49 is the driving pulley mounted upon the driving shaft 10 which carries through a cam arrangement 30 the driving annulus 25. In this instance, this annulus gears with driven cone portions 21 arranged towards the smaller ends of the satellites. Adjacent these portions 21 are the rolling cones 22, rolling on the fixed annulus 26 attached to the main casing 50.

To balance the action and give adequate support to the satellites, towards the other end thereof they are provided with conical portions 51 which roll in contact with the larger ends 14 of the sun cone, the smaller end 14ᵃ in this case meshing with the driven cones 21.

The driving cones or rollers 23 are engaged by the axially movable annulus 28 slidably mounted on projecting rods or pins 52 which may be to any required number, carried by a casing 53 keyed to the driven shaft 54 upon which is mounted a driven pulley 55.

In Fig. 6, the annulus 28 is shown engaging with the sections F—F of the driving cones 23, thus giving the full forward drive to the casing 53, shaft 54 and pulley 55 in agreement with that of the driving pulley 49. By operating a lever 56 (shown dotted) and in connection with a striking gear 57 (also shown dotted), the annulus 28 can be moved from the common section F—F to the common section N—N which is the neutral position, and in any intermediate position between these two positions the driven pulley 55 may have any speed from that of the driving pulley 49 to zero imparted thereto.

The annulus 28 can also be moved to the left from the position N—N to the position R—R which gives the full speed in the reverse direction, and in any position between N—N and R—R a reverse drive is given from zero to the full speed.

Although for some purposes the driven cone 21 of each satellite is made of smaller diameter than the rolling cone 22 thereof, this arrangement may be reversed.

To increase the gripping contact between the rolling cones 22 and their co-operating annulus 26, the annulus may be formed on one of its lateral surfaces with a number of bevelled cam-like portions and be permitted a slight rotational movement against spring pressure or against the axial thrust, the said cam-like portions co-operating with correspondingly formed portions on a fixed ring or upon fixed projections (such as indicated by 29, Figs. 1, 5 and 6) so that the tendency for the said fixed annulus 26 to move through a slight angular distance due to the rolling action of the rolling cones, causes a slight axial movement to increase the grip. This mechanism is of a known character and may similarly be applied as shown at 30, Figs. 1, 5 and 6, to the connection of the driving annulus 25 for the driven cones 21. In Fig. 1 moreover the interengaging bevelled cam portions can readily be seen.

It should be pointed out that although the sun pinion 12 fulfils a special function in the operation of the device yet this sun pinion is not absolutely necessary. In action it resembles an idler gear and it should be appreciated that the only essential condition in the gearing according to the invention is to transmit movement from the driving annulus 25 to the driven annulus 28. Generally speaking, the sun gear 12 serves to absorb and transmit the axial thrust due to the angular arrangement and conicity of the satellite gears, and generally to balance the action. Where employed, it may be made in more than one part, preferably with a thrust bearing or bearings between the parts.

Preferably, the satellite cones are mounted in their bearings in such a manner that they can move to a certain extent in an axial or substantially axial direction under the action of the cams 29 or 30 acting through the annuli and in this manner the grip is increased between the frictionally engaging coned surfaces. The movement may be purely axial, that is to say along the axes of the satellite cones, or may be parallel to the conical surface of the sun pinion, in which case the actual bearings for the spindles 19 of the satellite rollers may be made to rock to a slight extent in the portions of the cages by which they are carried.

The invention is not limited to the precise forms or details of construction described, as these may be varied to suit particular cases.

What I claim and desire to secure by Letters Patent of the United States of America is:—

1. An infinitely variable conical friction gear comprising a driving and a driven shaft, a plurality of conical satellite friction gears carried by cage means, the latter being adapted to be rotated about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones, driving means in connection with the driving shaft for frictionally engaging with the driven cones to rotate the satellite gears, a fixed track upon which the rolling cones engage and roll, rotatable means in frictional engagement with the driving cones and adapted to be set into various axial positions with respect thereto, and connecting means between said last-mentioned rotatable means and the driven shaft for imparting the movements of the said rotatable means to the driven shaft, for the purposes set forth.

2. An infinitely variable conical friction gear comprising a driving and a driven shaft, a plurality of conical satellite friction gears carried by cage means, the latter being adapted to be rotated about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones but having its axis coincident therewith, and the said driving cone being so disposed that it includes common circular sections with the theoretical extensions of the driven and rolling cones, driving means in connection with the driving shaft for frictionally engaging with the driven cones to rotate the satellite gears, a fixed track upon which the rolling cones engage and roll, rotatable means in frictional engagement with the driving cones and adapted to be set into various axial positions with respect thereto, and connecting means between said last-mentioned rotatable means and the driven shaft for imparting the movements of the said rotatable means to the driven shaft, for the purposes set forth.

3. An infinitely variable conical friction gear comprising a driving and a driven shaft, a plurality of conical satellite friction gears carried by cage means, the latter being adapted to be rotated about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones but having its axis coincident therewith, and the said driving cone being so disposed that it includes common circular sections with the theoretical extensions of the driven and rolling cones, the driving cone being moreover so arranged that the outermost generating line thereof comes parallel with the axis of the cage means, driving means in connection with the driving shaft for frictionally engaging with the driven cones to rotate the satellite gears, a fixed track upon which the rolling cones engage and roll, rotatable means in frictional engagement with the driving cones and adapted to be set into various axial positions with respect thereto, and connecting means between said last-mentioned rotatable means and the driven shaft for imparting the movements of the said rotatable means to the driven shaft, for the purposes set forth.

4. An infinitely variable conical friction gear comprising a driving and a driven shaft, a plurality of conical satellite friction gears carried by cage means, the latter being adapted to be rotated about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones but having its axis coincident therewith, and the said driving cone being so disposed that it includes common circular sections with the theoretical extensions of the driven and rolling cones, the driving cone being moreover so arranged that the outermost generating line thereof comes parallel with the axis of the cage means, driving means in connection with the driving shaft for frictionally engaging with the driven cones to rotate the satellite gears, a fixed track upon which the rolling cones engage and roll, a rotatable annulus in frictional engagement with the driving cones and adapted to be set into various axial positions with respect thereto, and connecting means between said annulus and the driven shaft for imparting the movements of rotation of the said annulus to the driven shaft, for the purposes set forth.

5. An infinitely variable conical friction gear comprising a driving and a driven shaft, a plurality of conical satellite friction gears carried by cage means, the latter being adapted to be rotated about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones but having its axis coincident therewith and the said driving cone being so disposed that it includes common circular sections with the theoretical extensions of the driven and rolling cones, the driving cone being moreover so arranged that the outermost generating line thereof comes parallel with the axis of the cage means, an annulus in connection with the driving shaft for frictionally engaging with the driven cones to rotate the satellite gears, a fixed track upon which the rolling cones engage and roll, rotatable means in frictional engagement with the driving cones and adapted to be set into various axial positions with respect thereto, and connecting means between said last-mentioned rotatable means and the driven shaft for imparting the movements of the said rotatable means to the driven shaft, for the purposes set forth.

6. An infinitely variable conical friction gear comprising a driving and a driven shaft, a plurality of conical satellite friction gears carried by cage means, the latter being adapted to be rotated about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones but having its axis coincident therewith, and the said driving cone being so disposed that it includes common circular sections with the theoretical extensions of the driven and rolling cones, the driving cone being moreover so arranged that the outermost generating line thereof comes parallel with the axis of the cage means, driving means in connection with the driving shaft for frictionally engaging with the driven cones to rotate the satellite gears, a fixed annulus upon which the rolling cones engage and roll, rotatable means in frictional engagement with the driving cones and adapted to be set into various axial positions with respect thereto, and connecting means between said last-mentioned rotatable means and the driven shaft for imparting the movements of the said rotatable means to the driven shaft, for the purposes set forth.

7. An infinitely variable conical friction gear comprising a driving and a driven shaft, a plurality of conical satellite friction gears carried by cage means, the latter being adapted to be rotated about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones but having its axis coincident therewith, and the said driving cone being so disposed that it includes common circular sections with the theoretical extensions of the driven and rolling cones, the driving cone being moreover so arranged that the outermost generating line thereof comes parallel with the axis of the cage means, an annulus in connection with the driving shaft for frictionally engaging with the driven cones to rotate the satellite gears, a fixed track upon which the rolling cones engage and roll, a rotatable annulus in frictional engagement with the driving cones and adapted to be set into various axial positions with respect thereto, and connecting means between said annulus and the driven shaft for imparting the movements of rotation of the said annulus to the driven shaft, for the purposes set forth.

8. An infinitely variable conical friction gear comprising a driving and a driven shaft, a plurality of conical satellite friction gears carried by cage means, the latter being adapted to be rotated about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones but having its axis coincident therewith, and the said driving cone being so disposed that it includes common circular sections with the theoretical extensions of the driven and rolling cones, the driving cone being moreover so arranged that the outermost generating line thereof comes parallel with the axis of the cage means, driving means in connection with the driving shaft for frictionally engaging with the driven cones to rotate the satellite gears, a fixed annulus upon which the rolling cones engage and roll, a rotatable annulus in frictional engagement with the driving cones and adapted to be set into various axial positions with respect thereto, and connecting means between said annulus and the driven shaft for imparting the movements of rotation of the said annulus to the driven shaft, for the purposes set forth.

9. An infinitely variable conical friction gear comprising a driving and a driven shaft, a plurality of conical satellite friction gears carried by cage means, the latter being adapted to be rotated about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones but having its axis coincident therewith, and the said driving cone being so disposed that it includes common circular sections with the theoretical extensions of the driven and rolling cones, the driving cone being moreover so arranged that the outermost generating line thereof comes parallel with the axis of the cage means, an annulus in connection with the driving shaft for frictionally engaging with the driven cones to rotate the satellite gears, a fixed annulus upon which the rolling cones engage and roll, rotatable means in frictional engagement with the driving cones and adapted to be set into various axial positions with respect thereto, and connecting means between said last-mentioned rotatable means and the driven shaft for imparting the movements of the said rotatable means to the driven shaft, for the purposes set forth.

10. An infinitely variable conical friction gear comprising a driving and a driven shaft, a plurality of conical satellite friction gears carried by cage means, the latter being adapted to be rotated about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones but having its axis coincident therewith, and the said driving cone being so disposed that it includes common circular sections with the theoretical extensions of the driven and rolling cones, the driving cone being moreover so arranged that the outermost generating line thereof comes parallel with the axis of the cage means, an annulus in connection with the driving shaft for frictionally engaging with the driven cones to rotate the satellite gears, a fixed annulus upon which the rolling cones engage and roll, a rotatable annulus in frictional engagement with the driving cones and adapted to be set into various axial positions with respect thereto, and connecting means between said annulus and the driven shaft for imparting the movements of rotation of the said annulus to the driven shaft, for the purposes set forth.

11. An infinitely variable conical friction gear comprising a driving and a driven shaft, a plurality of conical satellite friction gears carried by cage means, the latter being adapted to be rotated about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones but having its axis coincident therewith, and the said driving cone being so disposed that it includes common circular sections with the theoretical extensions of the driven and rolling cones, the driving cone being moreover so arranged that the outermost generating line thereof comes parallel with the axis of the cage means, driving means in connection with the driving shaft for frictionally engaging with the driven cones to rotate the satellite gears, a fixed annulus upon which the rolling cones engage and roll, cam means in connection with the said fixed annulus for permitting the said annulus to partake to a slight extent of the axial rotation around the axis of the cage to impart a slight axial movement to the said fixed annulus to increase the grip between itself and the satellite cones, rotatable means in frictional engagement with the driving cones and adapted to be set into various axial positions with respect thereto, and connecting means between said last-mentioned rotatable means and the driven shaft for imparting the movements of the said rotatable means to the driven shaft, for the purposes set forth.

12. An infinitely variable conical friction gear comprising a driving and a driven shaft, a plurality of conical satellite friction gears carried by cage means, the latter being adapted to be rotated about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones but having its axis coincident therewith and the said driving cone being so disposed that it includes common circular sections with the theoretical extensions of the driven and rolling cones, the driving cone being moreover so arranged that the outermost generating line thereof comes parallel with the axis of the cage means, an annulus in connection with the driving shaft for frictionally engaging with the driven cones to rotate the satellite gears, cam means in connection with the said annulus for permitting the said annulus to partake to a slight extent of the axial rotation around the axis of the cage to impart a slight axial movement to the said annulus to increase the grip between itself and the satellite cones, a fixed track upon which the rolling cones engage the roll, rotatable means in frictional engagement with the driving cones and adapted to be set into various axial positions with respect thereto, and connecting means between said last-mentioned rotatable means and the driven shaft for imparting the movements of the said rotatable means to the driven shaft, for the purposes set forth.

13. An infinitely variable conical friction gear comprising a driving and a driven shaft, a plurality of conical satellite friction gears carried by cage means, the latter being adapted to be rotated about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones but having its axis coincident therewith, and the said driving cone being so disposed that it includes common circular sections with the theoretical extensions of the driven and rolling cones. the driving cone being moreover so arranged that the outermost generating line thereof comes parallel with the axis of the cage means, an annulus in connection with the driving shaft for frictionally engaging with the driven cones to rotate the satellite gears, cam means in connection with the said annulus for permitting the said annulus to partake to a slight extent of the axial rotation around the axis of the cage to impart a slight axial movement to the said annulus to increase the grip between itself and the satellite cones, a fixed annulus upon which the rolling cones engage and roll, cam means in connection with said fixed annulus for permitting the said annulus to partake to a slight extent of the axial rotation around the axis of the cage to impart a slight axial movement to the said fixed annulus to increase the grip between itself and the satellite cones, a rotatable annulus in frictional engagement with the driving cones and adapted to be set into various axial positions with respect thereto, and connecting means between said annulus and the driven shaft for imparting the movements of rotation of the said annulus to the driven shaft, for the purposes set forth.

14. An infinitely variable conical friction gear comprising a driving and a driven shaft, a plurality of conical satellite friction gears, spindles for said satellite gears, bearings at the ends of each of said spindles, cage means for carrying the said bearings, the arrangement being such that the spindles can move to a desired axial extent in and through the said bearings, means for rotating the cage about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones, driving means in connection with the driving shaft for frictionally engaging with the driven cones to rotate the satellite gears, a fixed track upon which the rolling cones engage and roll, rotatable means in frictional engagement with the driving cones and adapted to be set into various axial positions with respect thereto, and connecting means between said last-mentioned rotatable means and the driven shaft for imparting the movements of the said rotatable means to the driven shaft, for the purposes set forth.

15. An infinitely variable conical friction gear comprising a driving and a driven shaft, a plurality of conical satellite friction gears, spindles for said satellite gears, bearings at the ends of each of the said spindles, cage means for carrying the said bearings, the arrangement being such that the spindles can move to a desired axial extent in and through the said bearings, means for rotating the cage about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones but having its axis coincident therewith, and the said driving cone being so disposed that it includes common circular sections with the theoretical extensions of the driven and rolling cones, the driving cone being moreover so arranged that the outermost generating line thereof comes parallel with the axis of the cage means, an annulus in connection with the driving shaft for frictionally engaging with the driven cones to rotate the satellite gears, a fixed annulus upon which the rolling cones engage and roll, a rotatable annulus in frictional engagement with the driving cones and adapted to be set into various axial positions with respect thereto, and connecting means between said annulus and the driven shaft for imparting the movements of rotation of the said annulus to the driven shaft, for the purposes set forth.

16. An infinitely variable conical friction gear comprising a driving and a driven shaft, a plurality of conical satellite friction gears carried by cage means, the latter being adapted to be rotated about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones, driving means in connection with the driving shaft for frictionally engaging with the driven cones to rotate the satellite gears, a fixed track upon which the rolling cones engage and roll, rotatable means in frictional engagement with the driving cones, striking gear for engaging the said rotatable means to set it into various axial positions with respect thereto, and connecting means between said last-mentioned rotatable means and the driven shaft for imparting the movements of the said rotatable means to the driven shaft, for the purposes set forth.

17. An infinitely variable conical friction gear comprising a driving and a driven shaft, a plurality of conical satellite friction gears carried by cage means, the latter being adapted to be rotated about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones, driving means in connection with the driving shaft for frictionally engaging with the driven cones to rotate the satellite gears, a fixed track upon which the rolling cones engage and roll, rotatable means in frictional engagement with the driving cones and adapted to be set into various axial positions with respect thereto, connecting means between said last-mentioned rotatable means and the driven shaft for imparting the movements of the said rotatable means to the driven shaft, and a sun pinion mounted to rotate about the axis of the cage and to be frictionally engaged by the satellite pinions, for the purposes set forth.

18. An infinitely variable conical friction gear comprising a driving and a driven shaft, a plurality of conical satellite friction gears carried by cage means, the latter being adapted to be rotated about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones but having its axis coincident therewith, and the said driving cone being so disposed that it includes common circular sections with the theoretical extensions of the driven and rolling cones, the driving cone being moreover so arranged that the outermost generating line thereof comes parallel with the axis of the cage means, an annulus in connection with the driving shaft for frictionally engaging with the driven cones to rotate the satellite gears, a fixed annulus upon which the rolling cones engage and roll, a rotatable annulus in frictional engagement with the driving cones and adapted to be set into various axial positions with respect thereto, connecting means between said annulus and the driven shaft for imparting the movements of rotation of the said annulus to the driven shaft, and a sun pinion mounted to rotate about the axis of the cage and to be frictionally engaged by the satellite pinions, for the purposes set forth.

19. An infinitely variable conical friction gear comprising a driving and a driven shaft, a plurality of conical satellite friction gears carried by cage means, the latter being adapted to be rotated about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones, driving means in connection with the driving shaft for frictionally engaging with the driven cones to rotate the satellite gears, a fixed track upon which the rolling cones engage and roll, rotatable means in frictional engagement with the driving cones and adapted to be set into various axial positions with respect thereto, connecting means between said last-mentioned rotatable means and the driven shaft for imparting the movements of the said rotatable means to the driven shaft, and thrust bearing means coaxial with the cage means, for the purposes set forth.

20. An infinitely variable conical friction gear comprising a driving and a driven shaft, a plurality of conical satellite friction gears carried by cage means, the latter being adapted to be rotated about an axis suitably disposed with regard to the driving and driven shafts, each conical satellite gear comprising a driven cone and a rolling cone having a common apex on the axis of the cage but having different apex angles, the said satellite gears also including a driving cone of the opposite conicity to the driven and rolling cones but having its axis coincident therewith, and the said driving cone being so disposed that it includes common circular sections with the theoretical extensions of the driven and rolling cones, the driving cone being moreover so arranged that the outermost generating line thereof comes parallel with the axis of the cage means, an annulus in connection with the driving shaft for frictionally engaging with the driven cones to rotate the satellite gears, a fixed annulus upon which the rolling cones engage and roll, a rotatable annulus in frictional engagement with the driving cones and adapted to be set into various axial positions with respect thereto, connecting means between said annulus and the driven shaft for imparting the movements of rotation of the said annulus to the driven shaft, and thrust bearing means coaxial with the cage means, for the purposes set forth.

21. An infinitely variable conical friction gear as claimed in claim 17, in which the sun pinion is formed with more than one engaging portion for co-operation with corresponding portions on the satellite conical gears, for the purposes set forth.

In witness whereof I affix my signature.

MAURICE WALTER PIERCEY.